United States Patent
Kwon et al.

(10) Patent No.: US 8,896,254 B2
(45) Date of Patent: Nov. 25, 2014

(54) ROBOT AND METHOD OF CONTROLLING THE SAME

(75) Inventors: Sung Gu Kwon, Suwon-si (KR); Dong Min Shin, Suwon-si (KR); Jong Owan Kim, Hwaseong-si (KR)

(73) Assignee: Samsung Electronics Co., Ltd., Suwon (KR)

(*) Notice: Subject to any disclaimer, the term of this patent is extended or adjusted under 35 U.S.C. 154(b) by 653 days.

(21) Appl. No.: 13/253,198

(22) Filed: Oct. 5, 2011

(65) Prior Publication Data

US 2012/0116581 A1    May 10, 2012

(30) Foreign Application Priority Data

Nov. 4, 2010    (KR) .................. 10-2010-0109394

(51) Int. Cl.
*G05B 9/02*    (2006.01)
*G05B 19/4067*    (2006.01)

(52) U.S. Cl.
CPC .. *G05B 19/4067* (2013.01); *G05B 2219/50083* (2013.01); *G05B 2219/50082* (2013.01)
USPC ....... 318/563; 318/568.11; 318/590; 318/440

(58) Field of Classification Search
USPC .............. 318/560, 563, 568, 0.11, 568.17, 318/568.18, 590, 440
See application file for complete search history.

(56) References Cited

U.S. PATENT DOCUMENTS

| | | | | |
|---|---|---|---|---|
| 4,442,387 A | * | 4/1984 | Lindbom | 318/568.13 |
| 4,697,979 A | * | 10/1987 | Nakashima et al. | 700/247 |
| 5,841,257 A | * | 11/1998 | Hashimoto et al. | 318/568.11 |
| 6,051,894 A | * | 4/2000 | Shimogama | 307/125 |
| 7,391,178 B2 | * | 6/2008 | Tanaka et al. | 318/568.2 |
| 8,659,254 B2 | * | 2/2014 | Ueno | 318/565 |

* cited by examiner

*Primary Examiner* — Bentsu Ro
*Assistant Examiner* — Thai Dinh
(74) *Attorney, Agent, or Firm* — Staas & Halsey LLP (57) ABSTRACT

A robot which is able to complete all or a part of desired operations and take a safety countermeasure in order to prevent an unexpected result from being obtained, even when a power source of a motor-based robot is unintentionally and suddenly cut off. A method of controlling a robot, which includes a main power source, a subsidiary power source and a motor to receive power from at least one of the main power source and the subsidiary power source, includes driving the motor using power supplied from the subsidiary power source if power supplied from the main power source is cut off, selecting at least one of a plurality of safety control modes to stably control the robot in consideration of a current state of the robot, and controlling the robot to operate in the selected safety control mode.

33 Claims, 8 Drawing Sheets

ROBOT AND METHOD OF CONTROLLING THE SAME

CROSS-REFERENCE TO RELATED APPLICATIONS

This application claims the benefit of Korean Patent Application No. 2010-0109394, filed on Nov. 4, 2010 in the Korean Intellectual Property Office, the disclosure of which is incorporated herein by reference.

BACKGROUND

1. Field

Embodiments relate to a robot including a plurality of joints, each of which is driven by a motor.

2. Description of the Related Art

In general, a mechanical device which performs motion similar to human motion using an electrical or magnetic mechanism is called a robot. Early robots included manipulators used for automated or unmanned tasks in manufacturing plants or industrial robots such as transportation robots, and performed dangerous tasks, simple repeated tasks or tasks requiring large force in place of a human. Recently, research into a humanoid robot, which has joints similar to those of a human, coexists with a human in a working and living space of the human and provides various services, has been actively conducted.

Most manipulators, transportation robots and humanoid robots are driven by motors. In particular, if a robot has joints, a motor is provided to each joint and each joint is moved by driving the motor. The movement of a motor-based device may be stopped in the following two cases: a first case where normal control is intentionally performed and a second case where an internal or external power source of the device is unintentionally and suddenly cut off. The first case is not problematic because the stoppage of the operation of the device is recognized in advance. In the second case, if the power source is suddenly cut off during the operation of the device, the motor falls to a free running state. In a movable device using multiple joints, such as a walking robot, the stoppage of the operation of the device due to unintended interruption of the power source may hinder the pursuit of the purpose of the operation of the device and obtain an unexpected result.

SUMMARY

Therefore, it is an aspect of an embodiment to provide a robot which is able to complete all or a part of desired operations and take a safety countermeasure in order to prevent an unexpected result from being obtained, even when a power source of a motor-based robot is unintentionally and suddenly cut off.

Additional aspects of embodiments will be set forth in part in the description which follows and, in part, will be obvious from the description, or may be learned by practice of the embodiments.

In accordance with an aspect of an embodiment, there is provided a method of controlling a robot which includes a main power source, a subsidiary power source and at least one motor to receive power from at least one of the main power source and the subsidiary power source and perform an operation, and operates by driving the motor, the method including driving the motor using power supplied from the subsidiary power source if power supplied from the main power source is cut off, selecting at least one of a plurality of safety control modes to stably control the robot in consideration of a current state of the robot, and controlling the robot to operate in the selected safety control mode.

The plurality of safety control modes may include a coast mode, a brake mode, a hold position mode and a keep previous command mode.

The coast mode may enable the motor to coast so as to stop the operation of the robot.

Supply of current to the motor may be cut off in the coast mode.

The coast mode may enable the robot to rapidly stop.

The robot may operate in the coast mode if the supply of the power from both the main power source and the subsidiary power source is cut off.

The brake mode may enable the operation of the robot to slowly stop as if braking force is applied.

The brake mode may enable the operation of the robot to slowly stop using back electromotive force of the motor.

The brake mode may be selected when a voltage of the motor is close to 0, current of the motor is less than threshold current, and torque of the motor is less than threshold torque in a state in which the power supplied from the main power source is cut off.

The hold position mode may enable the robot to be held in a previous state just before the main power source is cut off.

The hold position mode may be selected when a voltage of the motor is close to 0 and current of the motor is greater than or equal to threshold current in a state in which the power supplied from the main power source is cut off.

The keep previous command mode may enable a previous command just before the main power source is cut off to be continuously kept.

The keep previous command mode may be selected when the remaining capacity of the subsidiary power source is sufficient to continuously keep the command.

The keep previous command mode may be selected when a voltage of the motor is greater than or equal to a threshold voltage, current of the motor is greater than threshold current and torque of the motor is greater than threshold torque in a state in which the power supplied from the main power source is cut off.

In accordance with another aspect of an embodiment, there is provided a method of controlling a robot which includes a main power source, a subsidiary power source and at least one motor to receive power from at least one of the main power source and the subsidiary power source and perform an operation, and operates by driving the motor, the method including driving the motor using power supplied from the subsidiary power source if power supplied from the main power source is cut off, determining whether a selection condition of a safety control mode is satisfied from a safety control mode having highest priority according to priorities of a plurality of safety control modes to safely control the robot in consideration of a current state of the robot, selecting any one of the plurality of safety control modes according to the determined result, and controlling the robot to operate in the selected safety control mode.

The plurality of safety control modes may include a coast mode, a brake mode, a hold position mode and a keep previous command mode.

The priorities of the plurality of safety control modes may be assigned to the coast mode, the brake mode, the hold position mode and the keep previous command mode in this order.

The coast mode may enable the motor to coast so as to stop the operation of the robot.

The brake mode may enable the operation of the robot to slowly stop as if braking force is applied.

The hold position mode may enable the robot to be held in a previous state just before the main power source is cut off.

The keep previous command mode may enable a previous command just before the main power source is cut off to be continuously kept.

In accordance with another aspect of an embodiment, there is provided a method of controlling a robot which includes a main power source, a subsidiary power source and at least one motor to receive power from at least one of the main power source and the subsidiary power source and perform an operation, and operates by driving the motor, the method including driving the motor using power supplied from the subsidiary power source if power supplied from the main power source is cut off, selecting at least one from a first safety control mode to enable the motor to coast, a second safety control mode to enable the operation of the robot to slowly stop as if braking force is applied, a third safety control mode to enable the robot to be held in a previous state just before the main power source is cut off and a fourth safety control mode to continuously keep a previous command just before the main power source is cut off, in consideration of a current state of the robot and, and controlling the robot to operate in the selected safety control mode.

The first safety control mode may be a coast mode, the second safety control mode may be a brake mode, the third safety control mode may be a hold position mode and the fourth safety control mode may be a keep previous command mode.

In accordance with another aspect of an embodiment, there is provided a robot including a main power source, a subsidiary power source, at least one motor to receive power from at least one of the main power source and the subsidiary power source and perform an operation, and a controller to drive the motor using power supplied from the subsidiary power source if power supplied from the main power source is cut off, select at least one of a plurality of safety control modes to stably control the robot in consideration of a current state of the robot, and control the robot to operate in the selected safety control mode.

The plurality of safety control modes may include a coast mode, a brake mode, a hold position mode and a keep previous command mode.

The coast mode may enable the motor to coast so as to stop the operation of the robot.

The controller may operate the robot in the coast mode if the power supplied from both the main power source and the subsidiary power source is cut off.

The brake mode may enable the operation of the robot to slowly stop as if braking force is applied.

The controller may select the brake mode when a voltage of the motor is close to 0, current of the motor is less than threshold current, and torque of the motor is less than threshold torque in a state in which the power supplied from the main power source is cut off.

The hold position mode may enable the robot to be held in a previous state just before the main power source is cut off.

The controller may select the hold position mode when a voltage of the motor is close to 0 and current of the motor is greater than or equal to threshold current in a state in which the power supplied from the main power source is cut off.

The keep previous command mode may enable a previous command just before the main power source is cut off to be continuously kept.

The controller may select the keep previous command mode when a voltage of the motor is greater than or equal to a threshold voltage, current of the motor is greater than threshold current and torque of the motor is greater than threshold torque in a state in which the power supplied from the main power source is cut off.

BRIEF DESCRIPTION OF THE DRAWINGS

These and/or other aspects of embodiments will become apparent and more readily appreciated from the following description of the embodiments, taken in conjunction with the accompanying drawings of which:

FIG. 4 is a diagram showing a state in which a main power source of the control system of the robot shown in FIG. 1 is cut off and a subsidiary power source switch is turned on;

DETAILED DESCRIPTION

Reference will now be made in detail to embodiments, examples of which are illustrated in the accompanying drawings, wherein like reference numerals refer to like elements throughout.

The embodiments will be described with reference to FIGS. 1 to 8.

Figure 1:
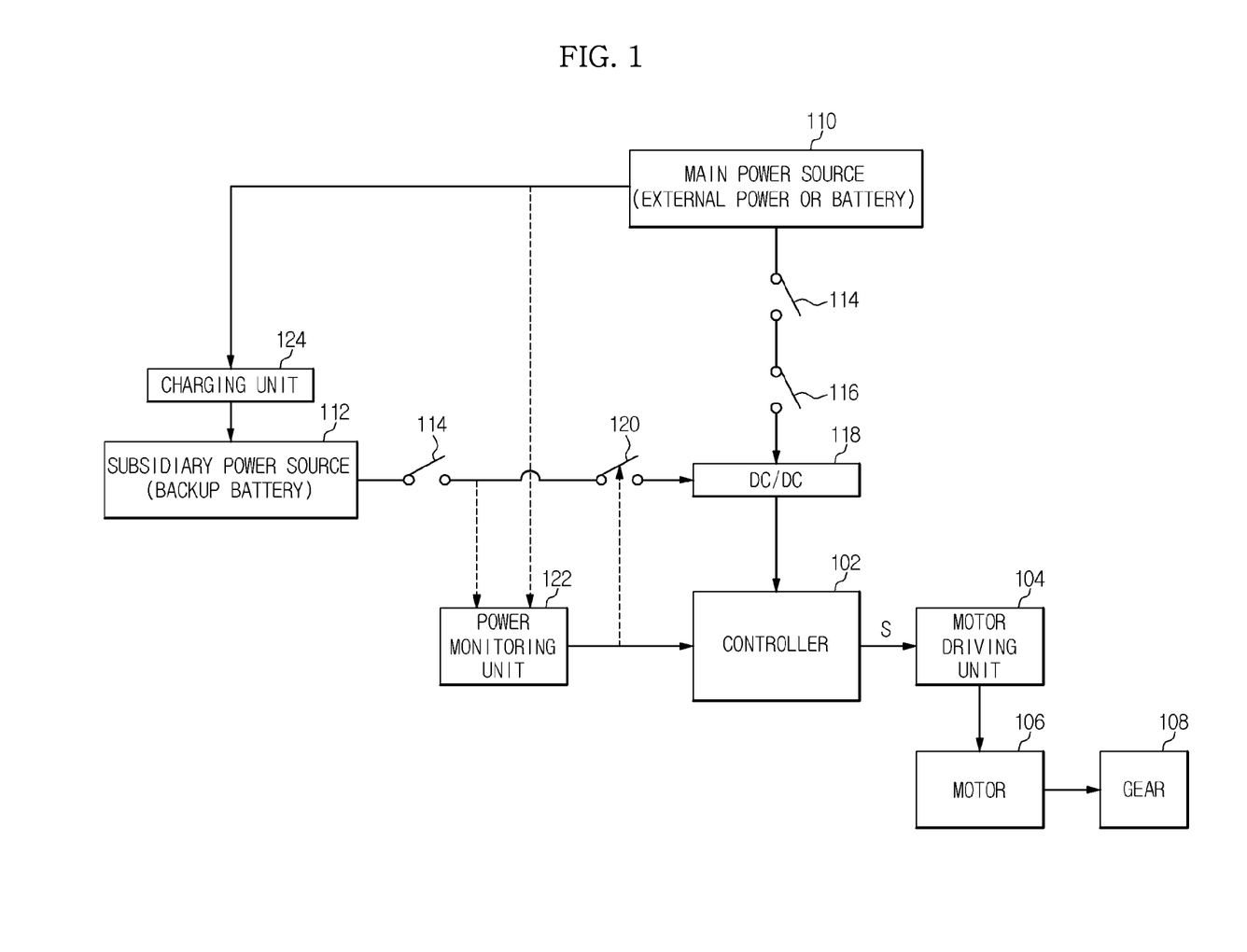
FIG. 1 is a diagram showing a control system of a robot according to an embodiment.

FIG. 1 is a diagram showing a control system of a robot according to an embodiment. As shown in FIG. 1, in the control system of the robot according to an embodiment, a controller 102 to control the overall operation of the robot transmits a control command S to a motor driving unit 104 and the motor driving unit 104 controls supply of current to a motor 106 according to the control command S so as to control rotation of the motor 106. A gear 108 rotates by the rotation of the motor 106 so as to move joints of the robot. The motor 106 and the gear 108 are included in each joint of the robot so as to move each joint.

As a power source to supply power to the controller 102 and the motor driving unit 104, a main power source 110 and a subsidiary power source 112 are used. An external power source or battery is used as the main power source 110. The robot according to an embodiment operates using power supplied from the main power source 110 while the main power source 110 normally supplies power and operates using power supplied from the subsidiary power source 112 if power supplied from the main power source 110 is cut off.

Power supplied from the main power source 110 is supplied to a DC/DC converter 118 through an emergency cutoff switch 114 and a main power source switch 116. The DC/DC converter 118 converts a DC voltage and DC current supplied from the main power source 110 into a voltage and current having a level required to operate the controller 102 and the motor driving unit 104 and supplies the converted voltage and current to the controller 102 and the motor driving unit 104. The main power source 110 continuously receives power from a commercial AC power source, etc. or uses a battery having a capacity greater than that of the subsidiary power source 112.

Power supplied from the subsidiary power source 112 is supplied to the DC/DC converter 118 through the emergency cutoff switch 114 and a subsidiary power source switch 120. The DC/DC converter 118 converts a DC voltage and DC current supplied from the subsidiary power source 112 into a voltage and current having a level required to operate the controller 102 and the motor driving unit 104 and supplies the converted voltage and current to the controller 102 and the motor driving unit 104. The subsidiary power source 112 temporarily supplies power to the robot when power supplied from the main power source 110 is cut off and uses a battery having a relatively small capacity in order to reduce a weight thereof and occupy less space. The capacity of the subsidiary power source 112 is preferably as large as possible within an allowable range of weight and volume.

The emergency cutoff switch 114 located on a power supply path of the main power source 110 and a power supply path of the subsidiary power source 112 is turned on so as to supply the power of the main power source 110 or the subsidiary power source 112 in a normal operation mode and is turned off so as to cut the supply of the power off in the event of an emergency. Accordingly, the supply of the power from the main power source 110 and the subsidiary power source 112 is possible only when the emergency cutoff switch 114 is on. When the emergency cutoff switch 114 is off, power supplied from the main power source 110 and power supplied from the subsidiary power source 112 are simultaneously cut off such that the robot rapidly stops when an emergency occurs. The emergency cutoff switch 114 may be implemented as one switch. Although the emergency cutoff switch 114 includes a plurality of switches, since the plurality of switches interlocks with each other, the plurality of switches is denoted by a single reference numeral. Since the emergency cutoff switch 114 is turned off in an emergency, the emergency cutoff switch 114 may be easily and rapidly manipulated (turned on/off) using a wireless remote controller.

The main power source switch 116 may interlock with a power on switch of the robot or the power on switch may be used as the main power source switch 116. The subsidiary power source switch 120 is immediately turned on when power supplied from the main power source 110 is cut off. A power source monitoring unit 122 monitors whether or not the power is supplied from the main power source 110. If the power supplied from the main power source 110 is cut off, the power source monitoring unit notifies the controller 102 that the power supplied from the main power source 110 is cut off and turns the subsidiary power source switch 120 on so such that the subsidiary power source 112 supplies power. The main power source switch 116 and the subsidiary power source switch 120 may be easily and rapidly manipulated (turned on/off) using a wireless remote controller, similar to the emergency cutoff switch 114.

A charging unit 124 charges the subsidiary power source 112. While power is supplied from the main power source 110, the charging unit 124 charges the subsidiary power source 112, for an emergency.

Figure 2:
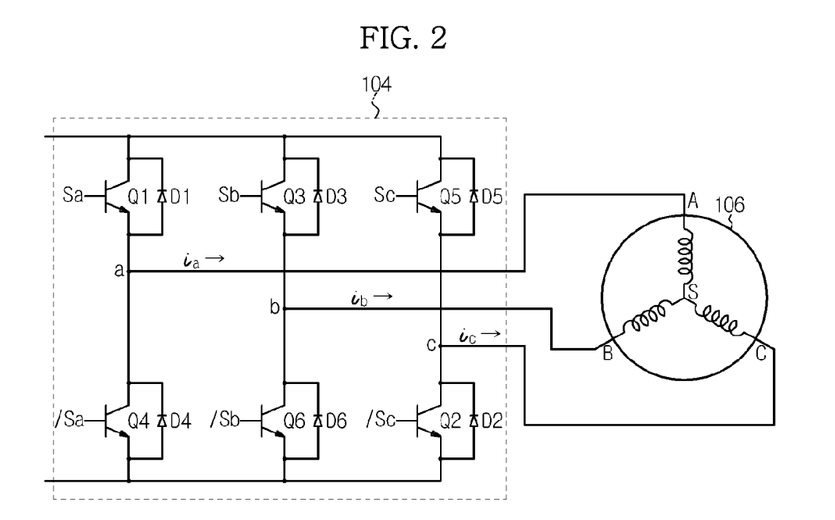
FIG. 2 is a diagram showing an inverter circuit of a motor driving unit shown in FIG. 1.

FIG. 2 is a diagram showing an inverter circuit of a motor driving unit shown in FIG. 1. The inverter circuit of the motor driving unit 104 generates multi-phase AC power to control the motor 106 and changes the phase of the power supplied to the motor 106 by switching a plurality of switching elements, that is, transistors Q1 to Q6, by the control command S received from the controller 102. Among the six transistors Q1 to Q6 of the inverter circuit, high-side transistors (three transistors located on a high side) Q1, Q3 and Q5 are respectively switched by inverter control signals Sa, Sb and Sc and low-side transistors (three transistors located on a low side) Q2, Q4 and Q6 are respectively switched by inverter control signals /Sa, /Sb and /Sc. As a result, the switching state of the high-side transistors Q1, Q3 and Q5 is opposite to the switching state of the low-side transistors Q2, Q4 and Q6. Diodes D1, D2, D3, D4, D5 and D6 respectively connected to the transistors Q1, Q2, Q3, Q4, Q5 and Q6 in parallel are free wheel diodes.

Figure 3:
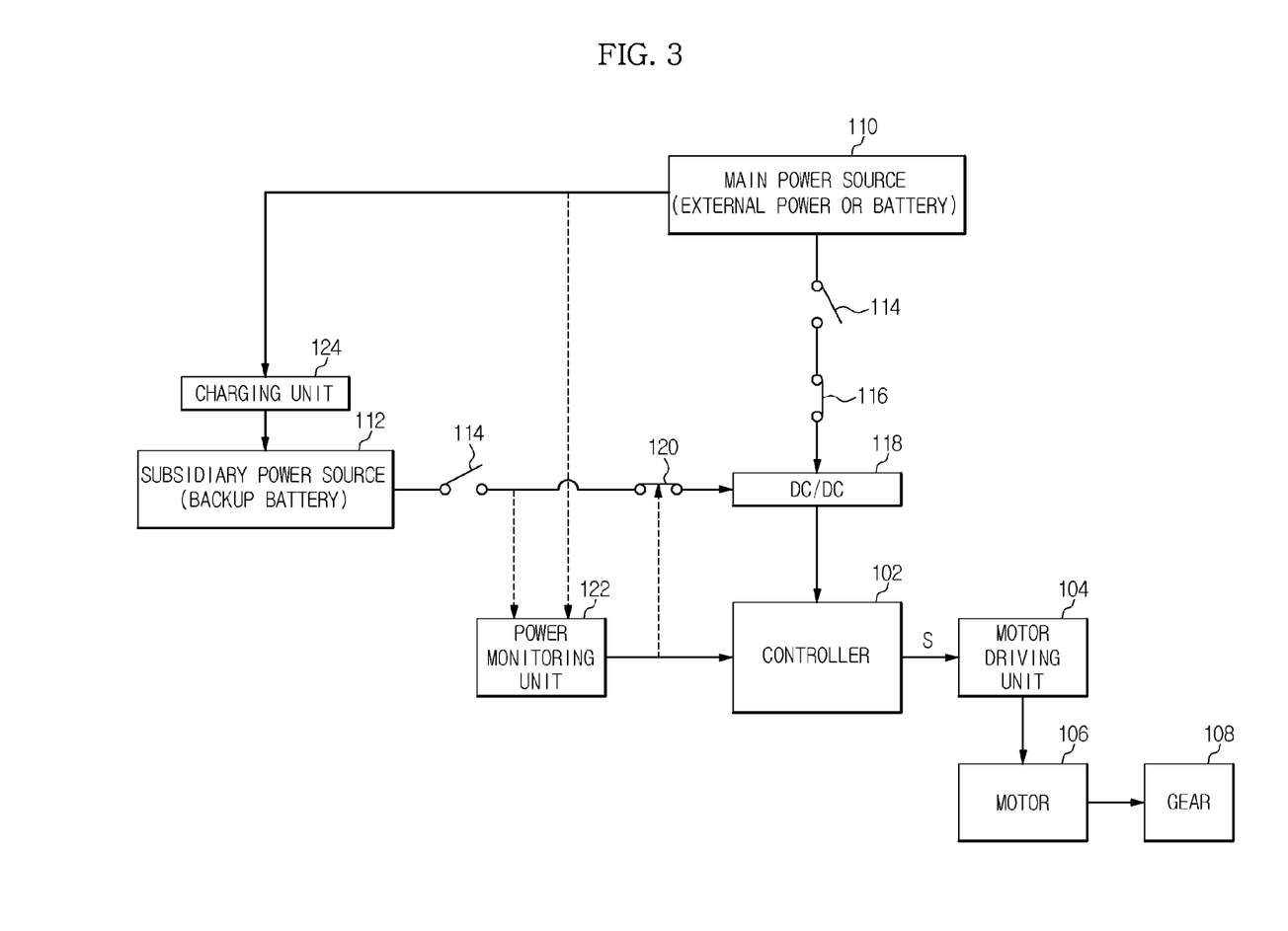
FIG. 3 is a diagram showing a state in which an emergency cutoff switch of the control system of the robot shown in FIG. 1 is turned off.

FIG. 3 is a diagram showing a state in which the emergency cutoff switch of the control system of the robot shown in FIG. 1 is turned off. In the state shown in FIG. 3, the main power source switch 116 and the subsidiary power source switch 120 are turned on but the emergency cutoff switch 114 is turned off (that is, an emergency occurs) such that the power supplied from both the main power source 110 and the subsidiary power source 112 are cut off. In an embodiment, a "Coast Mode" is performed to address emergencies.

Figure 4:
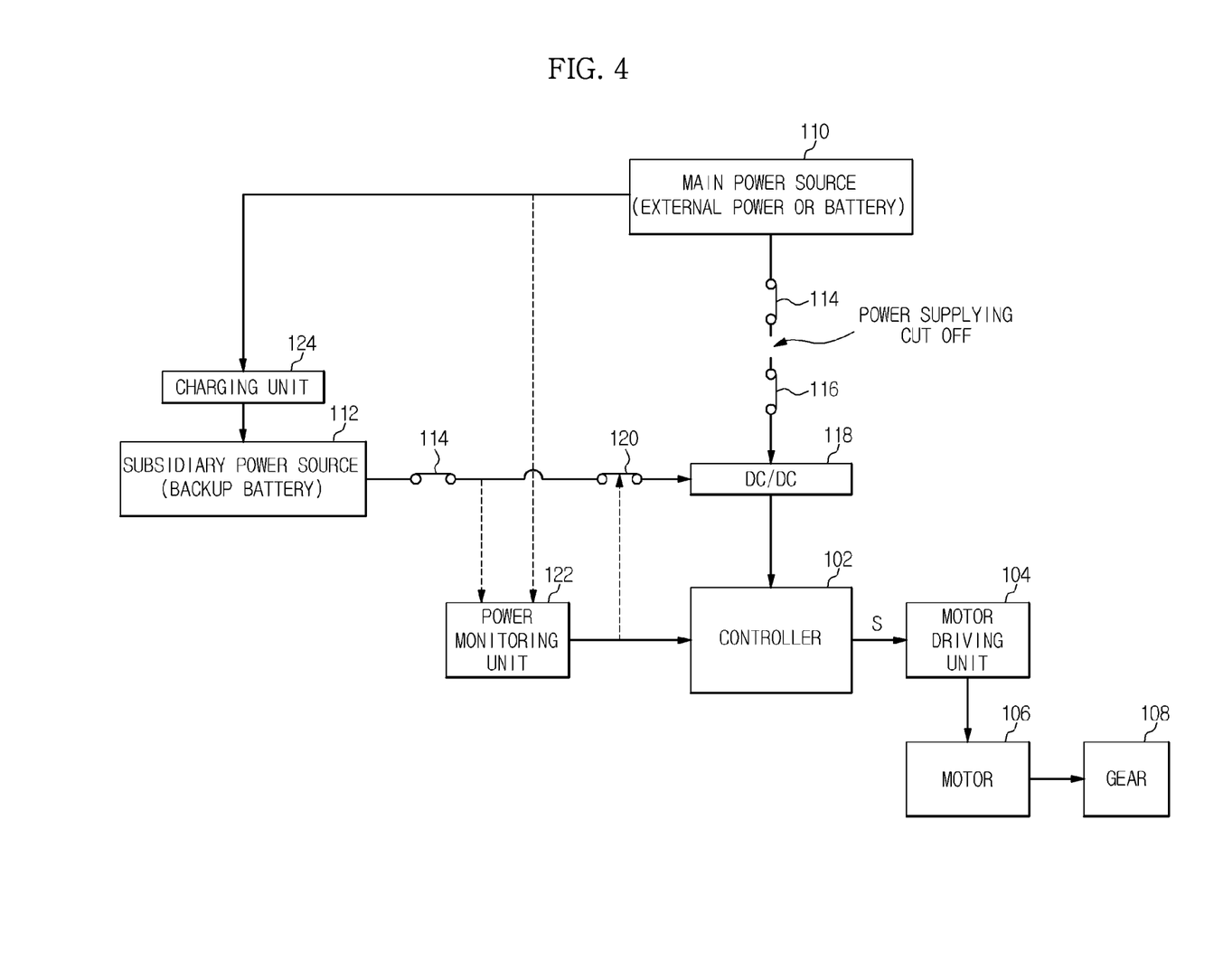

FIG. 4 is a diagram showing a state in which the main power source of the control system of the robot shown in FIG. 1 is cut off and the subsidiary power source switch is turned on. That is, in the state shown in FIG. 4, the main power source switch 116 and the subsidiary power source switch 120 are turned on and the emergency cutoff switch 114 is turned on (that is, a normal operation state). However, power supplied from the main power source 110 is cut off and only the subsidiary power source 112 supplies power. In an embodiment, in this case, any one of a "brake mode", a "hold position mode" and a "keep previous command mode" is selected and performed to cope with the cutoff of power supplied from the main power source 110.

Figure 5:
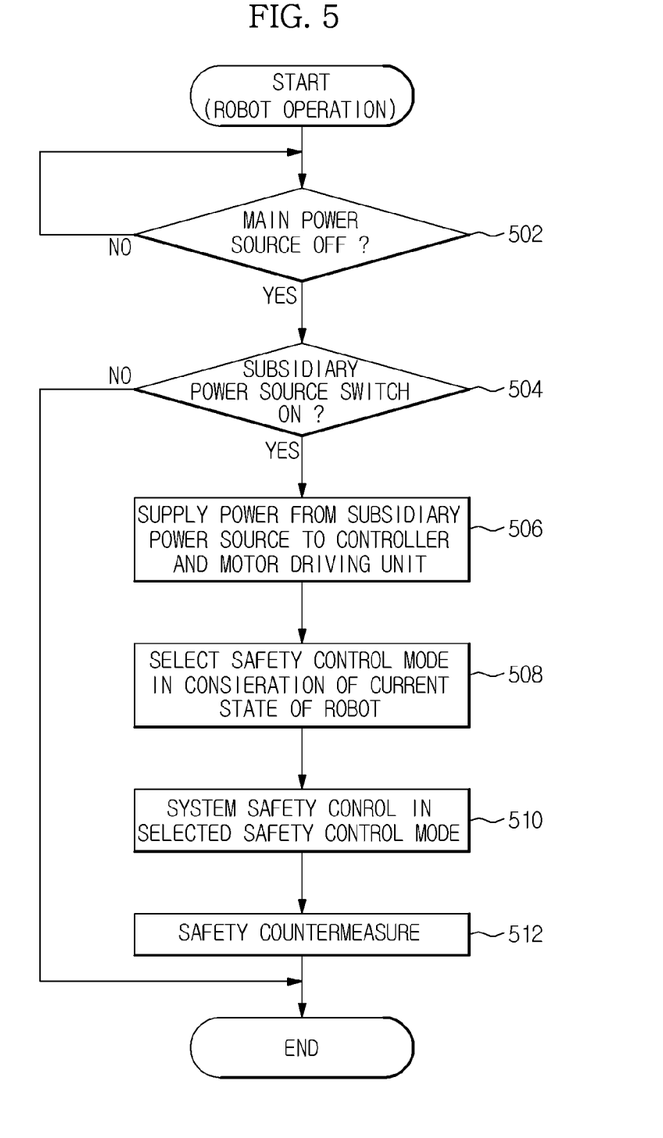
FIG. 5 is a flowchart illustrating a safety control method of a robot according to an embodiment.

FIG. 5 is a flowchart illustrating a safety control method of a robot according to an embodiment. As shown in FIG. 5, it is monitored whether the main power source 110 is cut off while the robot operates (502). If the main power source 110 is not cut off, the robot continues to operate (No of 502). In contrast, if the main power source 110 is cut off (Yes of 502) while the robot operates, it is checked whether the subsidiary power source switch 120 is turned on (504). If the subsidiary power source switch 120 is turned off (No of 504), both the main power source 110 and the subsidiary power source 112 may not be used and thus the operation of the robot is completed. In contrast, if the subsidiary power source switch 120 is turned on (Yes of 504), the subsidiary power source 112 supplies power to the controller 102 and the motor driving unit 104 (506). While the subsidiary power source 112 supplies power, in consideration of the current state of the robot, at least one of a plurality of safety control modes to safely control the robot is selected (508). If the safety control mode is selected, the robot is controlled in the selected safety control mode (510). Since the safety control mode is temporarily performed by the subsidiary power source 112, it is necessary to take a safety countermeasure to hold the robot in a safe state (512). The safety countermeasure includes supplying sufficient power to the robot or taking a countermeasure to hold the robot in a safe state.

The safety control mode according to an embodiment includes "brake mode", "hold position mode", "coast mode" and "keep previous command mode". The safety control modes and the method of selecting the same will now be described.

The "brake mode" is a safety control mode to slowly and naturally stop the operation of the robot using back electromotive force of the motor 106 as if brake force is applied. Back electromotive force is generated in a direction opposing to the rotation direction of the motor 106 while the motor 106 rotates. In the "brake mode", parts (e.g., the high-side transistors Q1, Q3 and Q5 or the low-side transistors Q2, Q4 and Q6 of the inverter circuit) of the switching elements Q1 to Q6 of the motor driving unit 104 are turned on (short-circuited) such that the motor 106 is driven by back electromotive force. To this end, in the "brake mode", the operation of the robot is slowly stopped in a horizontal direction and the robot slowly collapses the direction of gravity. For example, when a two-legged or four-legged walking robot enters the "brake mode" by external power cutoff, the robot is slowly collapsed in the direction of gravity while slightly coasting in a walking direction. As a result, the walking robot is collapsed and stopped. This "brake mode" is selected when the capacity of the subsidiary power source 112 is insufficient to perform a subsequent operation as in the "hold position mode" or the "keep previous command mode".

The "hold position mode" is a safety control mode to control the motor 106 such that the robot is held in a previous state just before the main power source 110 is cut off. In the "hold position mode", the motor 106 is controlled using the power of the subsidiary power source 112, but the capacity of the subsidiary power source 112 is small because the subsidiary power source 112 only assists the main power source 110. Accordingly, the robot is temporarily held in the previous state just before the main power source 110 is cut off until the safety countermeasure is taken (e.g., until the countermeasure against the cutoff of the main power source 110 is taken). The previous state considered in the "hold position mode" refers to a state in which current needs to be continuously supplied to the motor 106, such as a state in which the robot holds an object. The "hold position mode" is selected in order to prevent a person who stands near the robot from being injured by cutoff of the main power source 110 of the robot in a state in which the remaining capacity of the subsidiary power source 112 is secured to some extent. In the "hold position mode", a warning light is preferably blinked before the capacity of the subsidiary power source 112 is used up so as to enable a countermeasure to be rapidly taken.

The "coast mode" is a safety control mode to completely cut off the supply of current to the motor 106 when entering the "coast mode" so as not to perform the subsequent operation. In the "coast mode", all the switching elements (e.g., the high-side transistors (Q1, Q3 and Q5) and the low-side transistors (Q2, Q4 and Q6) of the inverter circuit) configuring the motor driving unit 104 are turned off in order to completely cut off the supply of current to the motor 106. To this end, the supply of current to the motor 106 is completely cut off such that the motor 106 is driven in a free running state and the robot coasts. For example, when a two-legged or four-legged walking robot enters the "coast mode" by external power cutoff, the walking robot instantaneously stops walking and suddenly collapses. The "coast mode" and the "brake mode" are different in that the "brake mode" refers to a state in which a pendulum suspended with a rope slowly falls and the "coast mode" refers to a state in which a pendulum suspended with a rope free falls when the rope is cut. The "coast mode" is selected when the robot rapidly stops in an emergency.

The "keep previous command mode" is a safety control mode to continuously keep a previous command which has been kept just before the cutoff of the main power source 110 if the main power source 110 is cut off. For example, when the main power source 110 is suddenly cut off in a state in which the robot pushes an object with specific force and enters the "keep previous command mode", the robot keeps the state of pushing the object while maintaining the pushing force and the operation. In the "keep previous command mode", the motor 106 is controlled using the subsidiary power source 112 but the capacity of the subsidiary power source 112 is small because the subsidiary power source 112 only assists the main power source 110. Thus, the previous command is continuously kept until the safety countermeasure against the cutoff of the main power source 110 is taken. In the "keep previous command mode", a warning light is preferably blinked before the capacity of the subsidiary power source 112 is used up so as to enable a safety countermeasure to be rapidly taken. The "keep previous command mode" is different from the "hold position mode" in that, while the operation state just before the main power source 110 is cut off is held in the "hold position mode", the command just before the main power source 110 is cut off is kept in the "keep previous command mode". The "keep previous command mode" is preferably selected when the power of the subsidiary power source 112 is sufficient or an emergency does not occur.

Figure 6:
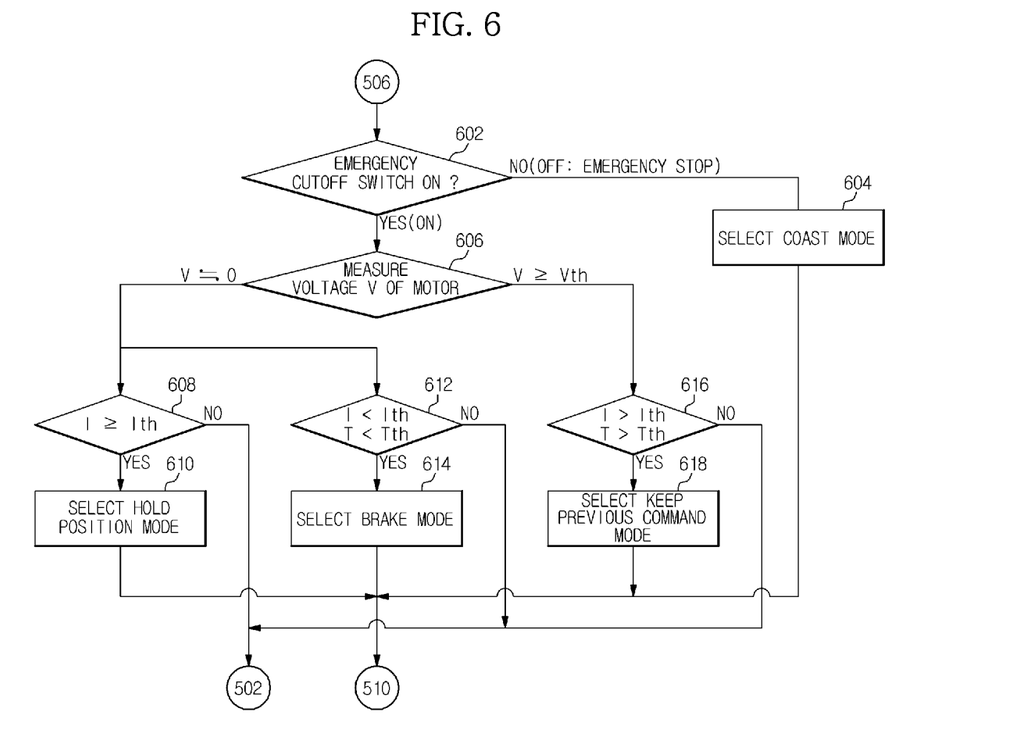
FIG. 6 is a flowchart illustrating a method of selecting a safety control mode in the safety control method of the robot shown in FIG. 5.

FIG. 6 is a flowchart illustrating a method of selecting a safety control mode in the safety control method of the robot shown in FIG. 5. As shown in FIG. 6, the controller 102 selects one of the four safety control modes according to the current state of the robot and controls the robot to operate in the selected safety control mode.

The following table shows conditions to perform the four safety control modes according to an embodiment. The controller 102 determines to which of the conditions the current state of the robot corresponds and selects one of the four safety control modes.

TABLE 1

| Emergency cutoff switch | Main power source switch | Subsidiary power source switch | Motor voltage (V) | Motor current (I) | Motor torque (T) | Selected safety control mode |
|---|---|---|---|---|---|---|
| off | — | — | — | — | — | Coast mode |
| on | off | on | V≅0 | I ≥ Ith | — | Hold position mode |
|  |  |  | V ≥ Vth | I < Ith | T < Tth | Brake mode |
|  |  |  |  | I > Ith | T > Tth | Keep previous command mode |

The controller 102 selects one of the "brake mode", the "hold position mode", the "coast mode" and the "keep previous command mode" in consideration of on/off of the emergency cutoff switch 114, the main power source switch 116 and the subsidiary power source switch 120, the voltage V of the motor 106, the current I of the motor 106 and the torque T of the motor 106.

Selection of "coast mode": The controller 102 selects "coast mode" (604) if the emergency cutoff switch 114 is turned off (No of 602) in a state in which power supplied from the main power source 110 is cut off and the subsidiary power source switch 120 is turned on.

Selection of "hold position mode": The controller 102 selects the "hold position mode" (610) if the emergency cutoff switch 114 is turned on (Yes of 602), the voltage V of the motor 106 is close to 0 (V≅0 of 606) and the current I of the motor 106 is greater than or equal to threshold current (I≥Ith) (Yes of 608). If the voltage V of the motor 106 is close to 0, it indicates that the voltage V of the motor 106 is closer to 0 than a threshold voltage Vth. If current I greater than or equal to the threshold continuously flows in the motor 106 in the state in which the voltage of the motor 106 is close to 0, it indicates that load is continuously applied to the motor 106. That is, it indicates that, if the robot is a robot hand having multiple joints to carry an object, the object is held and, if the robot is a humanoid robot, an object is held in the robot's hand. Accordingly, in this case, the "hold position mode" to hold the previous operation state to some extent is selected by continuously supplying current when the main power source 110 is cut off.

Selection of "brake mode": The controller 102 selects the "brake mode (614)" if the voltage V of the motor 106 is close to 0 ($V \cong 0$ of 606), the current I of the motor 106 is less than the threshold current (I<Ith) and the torque T of the motor 106 is less than a threshold torque Tth (T<Tth) (Yes of 612) in a state in which power supplied from the main power source 110 is cut off, the subsidiary power source switch 120 is turned on and the emergency cutoff switch 114 is turned on (Yes of 602). If the voltage V of the motor 106 is close to 0, it indicates that the voltage V of the motor 106 is closer to 0 than a threshold voltage Vth. If the current I and the torque T of the motor 106 are less than the respective thresholds, it indicates that the motor 106 does not perform an operation according to a specific command when the main power source 110 is cut off. Accordingly, in this case, the brake mode is selected such that the robot slowly stops by back electromotive force of the motor 106 by turning on (short-circuiting) parts of the switching elements of the motor driving unit 104.

Selection of "keep previous command mode": The controller 102 selects "keep previous command mode" if the voltage V of the motor 106 is greater than or equal to the threshold voltage Vth (V≥Vth of 606), the current I of the motor 106 is greater than the threshold current (I>Ith) and the torque T of the motor 106 is greater than the threshold torque Tth (T>Tth) (Yes of 616) in a state in which power supplied from the main power source 110 is cut off, the subsidiary power source switch 120 is turned on and the emergency cutoff switch 114 is turned on (Yes of 602). If the voltage V, the current I and the torque T of the motor 106 are greater than the respective thresholds, it indicates that the motor 106 is being driven so as to perform a specific operation when the main power source 110 is cut off. Accordingly, in this case, the "keep previous command mode" to hold the voltage V, the current I and the torque T of the motor 106 when the main power source 110 is cut off so as to continuously perform the operation to some extent is selected.

If the conditions are not satisfied in Operations 608, 612 and 616 of determining the remaining current, it is determined that the robot is in a normal state and the method proceeds to Operation 502 to continue to perform the desired operation.

The above-described threshold voltage Vth, threshold current Ith and threshold Tth are defined as follows. First, the threshold voltage Vth is a reliable minimum voltage value which enables the robot to stably perform the operation. For example, if it is assumed that a rated voltage supplied from the main power source 110 or the subsidiary power source 112 is 48V and current is not sufficiently supplied to the robot when the voltage is less than 42V, the threshold voltage Vth is set to 42V. Accordingly, if the voltage of the main power source 110 falls below the threshold voltage Vth, it may be determined that power supplied from the main power source 110 is cut off and then the subsidiary power source 112 may supply power. The threshold current Ith and the threshold torque Tth are respectively reliable minimum current and torque which enable the robot to stably operate.

Figure 7:
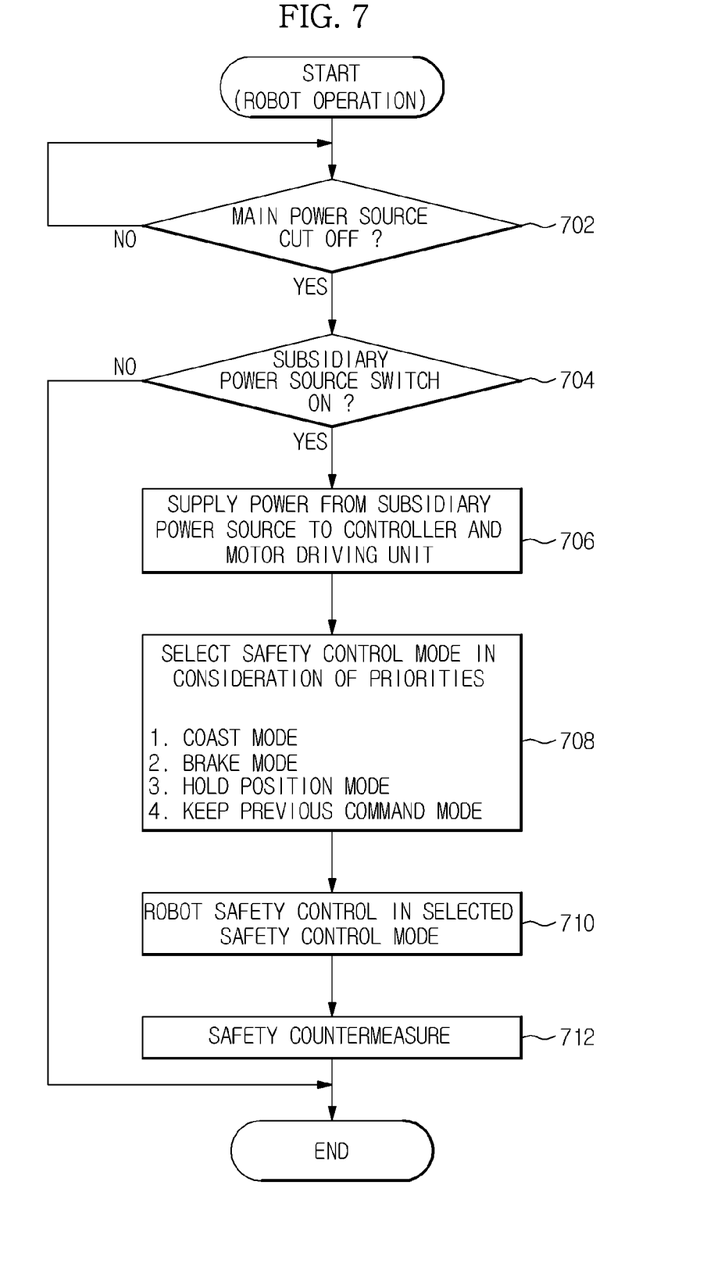
FIG. 7 is a flowchart illustrating a safety control method of a robot according to another embodiment.

FIG. 7 is a flowchart illustrating a safety control method of a robot according to another embodiment, in which a safety control mode is selected in consideration of priorities of four safety control modes.

As shown in FIG. 7, it is monitored whether the main power source 110 is cut off while the robot operates (702). If the main power source 110 is not cut off, the robot continues to operate (No of 702). In contrast, if the main power source 110 is cut off (Yes of 702) while the robot operates, it is checked whether the subsidiary power source switch 120 is turned on (704). If the subsidiary power source switch 120 is turned off (No of 704), both the main power source 110 and the subsidiary power source 112 may not be used and thus the operation of the robot is completed. In contrast, if the subsidiary power source switch 120 is turned on (Yes of 704), the subsidiary power source 112 supplies power to the controller 102 and the motor driving unit 104 (706). While the subsidiary power source 112 supplies power, in consideration of the current state of the robot, at least one of a plurality of safety control modes to safely control the robot is selected from the four safety control modes, that is, the "coast mode", the "brake mode", the "hold position mode" and the "keep previous command mode". At this time, it is determined whether or not the selection condition of a safety control mode is satisfied from a safety control mode having highest priority according to priorities of the safety control modes and any one of the plurality of safety control modes is selected according to the determined result (708). If the safety control mode is selected, the robot is controlled to operate in the selected safety control mode (710). Since the safety control mode is temporarily performed by the subsidiary power source 112, it is necessary to take a safety countermeasure in order to enable the robot to be held in a stable state (712). The safety countermeasure includes sufficiently supplying power to the robot or enabling the robot to be held in a stable state.

The safety control modes, that is, the "brake mode", the "hold position mode", the "coast mode" and the "keep previous command mode", according to an embodiment and the method of selecting the same will now be described.

Priority 1: Coast mode: The "coast mode" is a safety control mode having highest priority. The "Coast mode" is a safety control mode to completely cut off the supply of current to the motor 106 when entering the "coast mode" so as not to perform the subsequent operation. In the "coast mode", all the switching elements (e.g., the high-side transistors (Q1, Q3 and Q5) and the low-side transistors (Q2, Q4 and Q6) of the inverter circuit) configuring the motor driving unit 104 are turned off in order to completely cut off the supply of current to the motor 106. To this end, the supply of current to the motor 106 is completely cut off such that the motor 106 is driven in a free running state and the robot coasts. For example, when a two-legged or four-legged walking robot enters the "coast mode" by external power cutoff, the walking robot instantaneously stops walking and suddenly collapses. The "coast mode" and the "brake mode" are different in that the "brake mode" refers to a state in which a pendulum suspended with a rope slowly falls and the "coast mode" refers to a state in which a pendulum suspended with a rope falls free by cutting the rope. The "coast mode" preferably has highest priority since it is necessary when the robot rapidly stops in an emergency.

Priority 2: "Brake mode": The "brake mode" is a safety control mode having second highest priority. The "brake mode" is a safety control mode to slowly stop the operation of the robot using back electromotive force of the motor 106 as brake force. Back electromotive force is generated in a direction opposing to the rotation direction of the motor 106 while the motor 106 rotates. In the "brake mode", parts (e.g., the high-side transistors Q1, Q3 and Q5 or the low-side transistors Q2, Q4 and Q6 of the inverter circuit) of the switching elements Q1 to Q6 of the motor driving unit 104 are turned on (short-circuited) such that the motor 106 is driven by back electromotive force. To this end, in the "brake mode", the operation of the robot is slowly stopped in a horizontal direction and the robot slowly collapses in the direction of gravity. For example, when a two-legged or four-legged walking robot enters the "brake mode" by external power cutoff, the robot slowly collapses in the direction of gravity while slightly coasting in a walking direction. As a result, the walking robot is collapsed and stopped. This "brake mode" has second priority since it is suitable when the capacity of the subsidiary power source 112 is insufficient to perform a subsequent operation as in the "hold position mode" or the "keep previous command mode" but has urgency lower than that of the "coast mode".

Priority 3: "Hold position mode": The "hold position mode" is a safety control mode having third highest priority. The "hold position mode" is a safety control mode to control the motor 106 such that the robot is held in a previous state just before the main power source 110 is cut off. In the "hold position mode", the motor 106 is controlled using power of the subsidiary power source 112, but the capacity of the subsidiary power source 112 is small because the subsidiary power source 112 only assists the main power source 110. Accordingly, the robot is temporarily held in the previous state just before the main power source 110 is cut off until the safety countermeasure is taken (e.g., until the countermeasure against the cutoff of the main power source 110 is taken). The previous state considered in the "hold position mode" refers to a state in which current needs to be continuously supplied to the motor 106, such as a state in which the robot holds an object. The "hold position mode" is selected in order to prevent a person who stands near the robot from being injured by cutoff of the main power source 110 of the robot in a state in which the remaining capacity of the subsidiary power source 112 is secured to some extent. In the "hold position mode", a warning light is preferably blinked before the capacity of the subsidiary power source 112 is used up so as to enable a safety countermeasure to be rapidly taken.

Priority 4: "Keep previous command mode": The "keep previous command mode" is a safety control mode to continuously keep a previous command just before the cutoff of the main power source 110 when the main power source 110 is cut off. For example, when the main power source 110 is suddenly cut off in a state in which the robot pushes an object with specific force and enters the "keep previous command mode", the robot continues pushing the object while maintaining the pushing force and the operation. In the "keep previous command mode", the motor 106 is controlled using the subsidiary power source 112 but the capacity of the subsidiary power source 112 is small because the subsidiary power source 112 only assists the main power source 110. Thus, the previous command is continued until the safety countermeasure against the cutoff of the main power source 110 is taken. In the "keep previous command mode", a warning light is preferably blinked before the capacity of the subsidiary power source 112 is used up so as to enable a safety countermeasure to be rapidly taken. The "keep previous command mode" is different from the "hold position mode" in that, while the previous operation state just before the main power source 110 is cut off is held in the "hold position mode", the previous command just before the main power source 110 is cut off is kept in the "keep previous command mode". The "keep previous command mode" is preferably selected when the power of the subsidiary power source 112 is sufficient or an emergency does not occur. Accordingly, lowest priority is preferably assigned to the "keep previous command mode".

Figure 8:
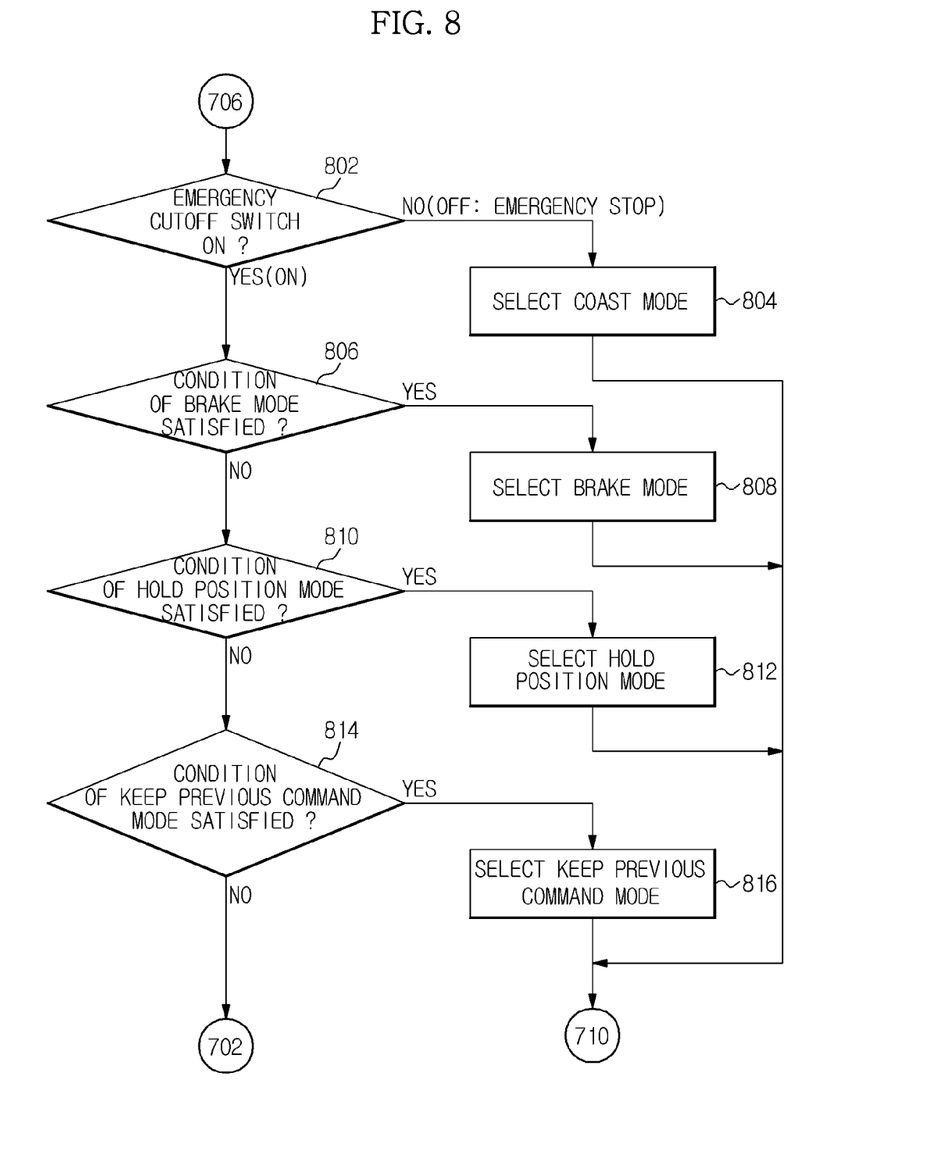
FIG. 8 is a flowchart illustrating a method of selecting a safety control mode in the safety control method of the robot shown in FIG. 7.

FIG. 8 is a flowchart illustrating a method of selecting a safety control mode in the safety control method of the robot shown in FIG. 7. As shown in FIG. 8, the controller 102 selects the "coast mode" having highest priority (804) if the emergency cutoff switch 114 is turned off (No of 802) in a state in which power supplied from the main power source 110 is cut off and the subsidiary power source switch 120 is turned on. If the selection condition of the "coast mode" is not satisfied (Yes of 802) (e.g., if the emergency cutoff switch 114 is turned on), it is determined whether the condition of the "brake mode" having second highest priority is satisfied and the "brake mode" is selected (808) if the condition of the "brake mode" is satisfied (Yes of 806). If the condition of the "brake mode" is not satisfied (No of 806), it is determined whether the condition of the "hold position mode" having third highest priority is satisfied and the "hold position mode" is selected (812) if the condition of the "hold position condition" is selected (Yes of 810). If the condition of the "hold position mode" is not satisfied (No of 810), it is determined whether the condition of the "keep previous command mode" having lowest priority is satisfied and the "keep previous command mode" is selected (816) if the condition of the "keep previous command mode" is satisfied (Yes of 814). If the condition of the "keep previous command mode" is not satisfied, it is determined that the robot is in a normal state and the method proceeds to Operation 702 and continues to perform the desired operation.

According to embodiments, it is possible to complete all or a part of desired operations and to take a safety countermeasure, even when a power source of a motor-based robot is unintentionally and suddenly cut off.

The embodiments can be implemented in computing hardware and/or software, such as (in a non-limiting example) any computer that can store, retrieve, process and/or output data and/or communicate with other computers. A program/software implementing the embodiments may be recorded on non-transitory computer-readable media comprising computer-readable recording media. Examples of the computer-readable recording media include a magnetic recording apparatus, an optical disk, a magneto-optical disk, and/or a semiconductor memory (for example, RAM, ROM, etc.). Examples of the magnetic recording apparatus include a hard disk device (HDD), a flexible disk (FD), and a magnetic tape (MT). Examples of the optical disk include a DVD (Digital Versatile Disc), a DVD-RAM, a CD-ROM (Compact Disc-Read Only Memory), and a CD-R (Recordable)/RW.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. A method comprising:
when power supplied from a main power source to a motor of a robot to drive the motor is cut off,
supplying power to the motor from a subsidiary power source to thereby drive the motor with the power supplied from the subsidiary power source,
selecting at least one of a plurality of safety control modes to stably control the robot in consideration of a current state of the robot with the motor being driven with the power supplied from the subsidiary power source, and controlling the robot to operate in the selected safety control mode.

2. The method according to claim 1, wherein the plurality of safety control modes includes a coast mode, a brake mode, a hold position mode and a keep previous command mode.

3. The method according to claim 2, wherein supply of current to the motor is cut off in the coast mode.

4. The method according to claim 2, wherein the coast mode enables the robot to rapidly stop.

5. The method according to claim 2, wherein the robot operates in the coast mode if the supply of the power from both the main power source and the subsidiary power source is cut off.

6. The method according to claim 2, wherein the brake mode enables an operation of the robot to slowly stop as if braking force is applied.

7. The method according to claim 2, wherein the brake mode enables an operation of the robot to slowly stop using back electromotive force of the motor.

8. The method according to claim 2, wherein the brake mode is selected when a voltage of motor is close to 0, current of the motor is less than threshold current, and torque of the motor is less than threshold torque in a state in which the power supplied from the main power source is cut off.

9. The method according to claim 2, wherein the hold position mode enables the robot to be held in a previous state just before the power supplied from the main power source is cut off.

10. The method according to claim 2, wherein the hold position mode is selected when a voltage of the motor is close to 0 and current of the motor is greater than or equal to threshold current in a state in which the power supplied from the main power source is cut off.

11. The method according to claim 2, wherein the keep previous command mode enables a previous command just before the power supplied from the main power source is cut off to be continuously kept.

12. The method according to claim 2, wherein the keep previous command mode is selected when the remaining capacity of the subsidiary power source is sufficient to continuously keep a command.

13. The method according to claim 2, wherein the keep previous command mode is selected when a voltage of the motor is greater than or equal to a threshold voltage, current of the motor is greater than threshold current and torque of the motor is greater than threshold torque in a state in which the power supplied from the main power source is cut off.

14. The method according to claim 1, wherein the coast mode enables the motor to coast so as to stop an operation of the robot.

15. A method comprising:
when power supplied from a main power source to a motor of a robot to drive the motor is cut off,
supplying power to the motor from a subsidiary power source to thereby drive the motor with the power supplied from the subsidiary power source,
determining whether a selection condition of a safety control mode is satisfied, starting with a safety control mode of a plurality of safety control modes having highest priority and continuing, in order of decreasing priority, through other safety control modes, until it is determined that a selection safety condition is satisfied, selecting a safety control mode of the plurality of safety control modes according to a result of said determining, and controlling the robot to operate in the selected safety control mode.

16. The method according to claim 15, wherein the plurality of safety control modes includes a coast mode, a brake mode, a hold position mode and a keep previous command mode.

17. The method according to claim 16, wherein the priorities of the plurality of safety control modes are assigned to the coast mode, the brake mode, the hold position mode and the keep previous command mode in this order.

18. The method according to claim 16, wherein the coast mode enables the motor to coast so as to stop an operation of the robot.

19. The method according to claim 16, wherein the brake mode enables an operation of the robot to slowly stop as if braking force is applied.

20. The method according to claim 16, wherein the hold position mode enables the robot to be held in a previous state just before the power supplied from the main power source is cut off.

21. The method according to claim 16, wherein the keep previous command mode enables a previous command just before the power supplied from the main power source is cut off to be continuously kept.

22. A method comprising:
when power supplied from a main power source to a motor of a robot to drive the motor is cut off,
selecting at least one of a first safety control mode to enable the motor to coast, a second safety control mode to enable an operation of the robot to slowly stop as if braking force is applied, a third safety control mode to enable the robot to be held in a previous state just before the power supplied from the main power source is cut off and a fourth safety control mode to continuously keep a previous command just before the power supplied by the main power source is cut off, in consideration of a current state of the robot with the motor being driven with the power supplied from the subsidiary power source and, and
controlling the robot to operate in the selected safety control mode.

23. The method according to claim 22, wherein the first safety control mode is a coast mode, the second safety control mode is a brake mode, the third safety control mode is a hold position mode and the fourth safety control mode is a keep previous command mode.

24. A robot comprising:
a main power source;
a subsidiary power source;
a motor to receive power from at least one of the main power source and the subsidiary power source; and
a controller to, when power supplied from the main power source to a motor to drive the motor is cut off,
drive the motor with power supplied from the subsidiary power source to thereby drive the motor with the power supplied from the subsidiary power source,
select at least one of a plurality of safety control modes to stably control the robot in consideration of a current state of the robot with the motor being driven with the power supplied from the subsidiary power source, and
control the robot to operate in the selected safety control mode.

25. The robot according to claim 24, wherein the plurality of safety control modes includes a coast mode, a brake mode, a hold position mode and a keep previous command mode.

26. The robot according to claim 25, wherein the coast mode enables the motor to coast so as to stop an operation of the robot.

27. The robot according to claim 26, wherein the controller operates the robot in the coast mode if the power supplied from both the main power source and the subsidiary power source is cut off.

28. The robot according to claim 25, wherein the brake mode enables the operation of the robot to slowly stop as if braking force is applied.

29. The robot according to claim 28, wherein the controller selects the brake mode when a voltage of the motor is close to 0, current of the motor is less than threshold current, and torque of the motor is less than threshold torque in a state in which the power supplied from the main power source is cut off.

30. The robot according to claim 25, wherein the hold position mode enables the robot to be held in a previous state just before the power supplied from the main power source is cut off.

31. The robot according to claim 30, wherein the controller selects the hold position mode when a voltage of the motor is close to 0 and current of the motor is greater than or equal to threshold current in a state in which the power supplied from the main power source is cut off.

32. The robot according to claim 25, wherein the keep previous command mode enables a previous command just before the power supplied from the main power source is cut off to be continuously kept.

33. The robot according to claim 32, wherein the controller selects the keep previous command mode when a voltage of the motor is greater than or equal to a threshold voltage, current of the motor is greater than threshold current and torque of the motor is greater than threshold torque in a state in which the power supplied from the main power source is cut off.

* * * * *